Feb. 2, 1937.  R. O. HENSZEY  2,069,309

FLOW INDICATOR

Filed July 26, 1934

INVENTOR

Roy O. Henszey

BY Wheeler Wheeler and Wheeler

ATTORNEYS

Patented Feb. 2, 1937

2,069,309

UNITED STATES PATENT OFFICE 2,069,309

FLOW INDICATOR

Roy O. Henszey, Oconomowoc, Wis.

Application July 26, 1934, Serial No. 737,016

6 Claims. (Cl. 73—208)

This invention relates to improvements in flow indicators.

It is the primary object of the invention to indicate with accuracy the flow of fluid (and particularly the flow of liquid) occurring through a given conduit. More particularly, it is my purpose to provide a flow indicator wherein the displacement will be accurately proportioned to the flow so that the index can be calibrated in uniformly spaced graduations.

Other objects relate to means for insuring accuracy by eliminating as far as possible the effect of momentum on the pressure responsive device; by providing pressure slots carried by the pressure responsive device itself as distinguished from any stationary portion of the apparatus, thereby facilitating correction in the event of error; by providing a pressure responsive device which definitely seats as a valve until the flow is sufficient to give appropriate reading, thereby insuring accuracy down to the zero point of the apparatus; and providing a novel and improved set of motion transmitting connections for operating the pointer across the index scale with a minimum of frictional resistance and subject to a variable load by means of which minor adjustments may be effected outside of the casing in which the flow responsive member is housed.

In my device, the flow responsive member takes the form of a valve plunger operated by the pressure differential across it, the area of the plunger being sufficient to give all of the pressure necessary to minimize frictional effects in the motion transmission connections and the travel of the plunger being sufficiently long to eliminate error and give a clear reading unaffected by factors which in prior art devices have tended for inaccuracy.

In the drawing.

Like parts are designated by the same reference characters throughout the several views.

Figure 1:
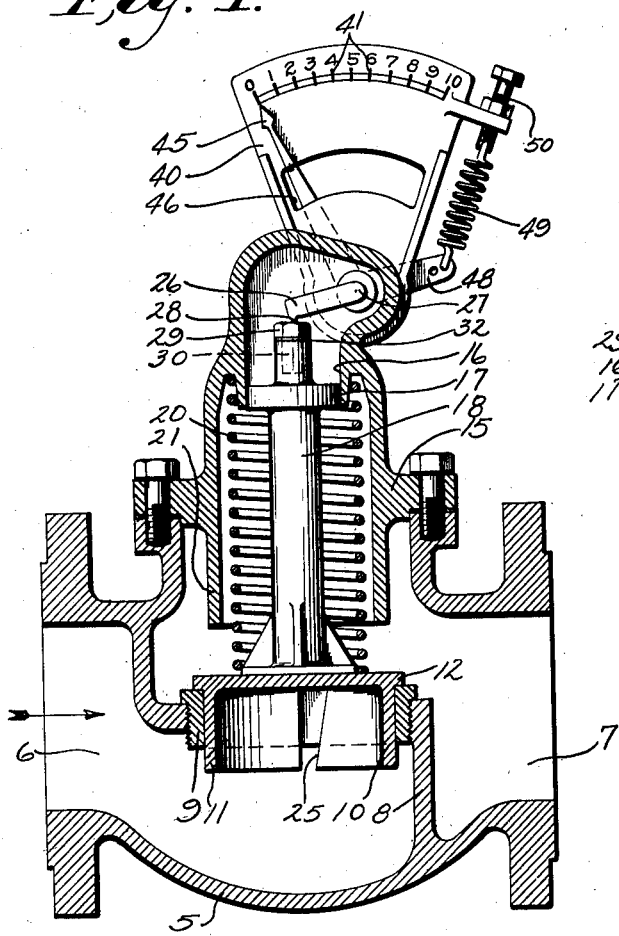
Fig. 1 is a vertical axial section through a device embodying the invention.
Figure 2:
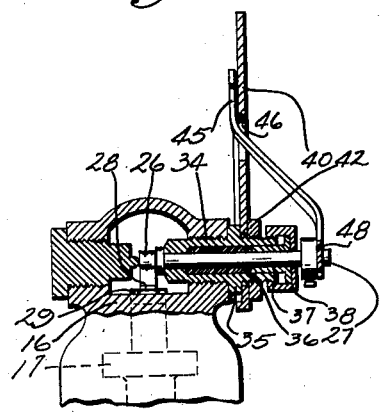
Fig. 2 is a fragmentary detail view showing in section a portion of the motion transmitting connections.
Figure 3:
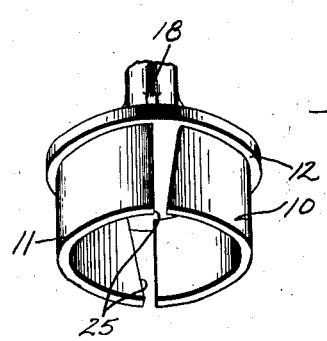
Fig. 3 is a detail view in perspective showing the pressure responsive plunger.

The casing 5 is similar to a valve casing having an inlet port at 6, an outlet port at 7, and a partition web 8 threaded to receive a seat member 9 in which the pressure responsive plunger 10 is reciprocable.

The plunger 10 has a reasonably close fit slidably in the seat member 9, but the fit is not sufficiently close to develop any substantial amount of friction. Leakage occurs between the seat member 9 and the skirt portion 11 of the pressure responsive member 10 when said member is open. When said member is closed, its flange 12 seats tightly on the face of the seat member 9 to completely stop all flow.

A removable closure 15 for the casing 5 provides a cylinder 16 serving as a dash pot. Reciprocably guided by this cylinder is a piston 17 connected by valve stem 18 with the flow responsive member 10. A spring seat is provided about the lower end of cylinder 16. Compression spring 20 is confined between this seat and the flow responsive member to maintain said member normally in the position illustrated in Fig. 1.

A skirt 21 depending from the closure 15 serves as a stop to limit the lifting movement of member 10. Thus the flow responsive member is guided by the seat element 9 and the surface of cylinder 16. It is made of very light material so that it requires for strength the reinforcing shown. Its lightness minimizes inertia and momentum effects which might otherwise disturb its reading. Temporary and sudden fluctuations of pressure are smoothed out by the dash pot action of piston 17 moving in the enclosed chamber 16.

As the flow responsive member 10 is raised from its seat on element 9 it exposes to a greater or less degree one or more slots 25 in its skirt portion 11. Flow from the inlet to the outlet occurs through these slots which are preferably two in number and located diametrically opposite to each other. Their exact form must be determined by trial and error to give entire accuracy, but the general form will be that clearly shown in the drawing. This form will have the effect of permitting a flow which in all positions of member 10 will be directly proportioned to the displacement of said member. The fact that these slots are made in a movable member, facilitates the determination of the proper size and shape of the slots and the work thereon to reduce them to said size and shape. This may be done by adding metal by welding or the like, or by removing metal by filing or grinding, until the required result is secured. The shape of the slots is so determined in the calibration of the instrument as to compensate for any leakage which occurs between the member 10 in its open position and the seat member 9.

Within the cylinder chamber 16, a rocker arm 26 carried by rock shaft 27 is positioned at such an angle that its knife edge finger 28 will engage the hardened head of cap screw 29 at a certain distance below the horizontal plane passing through the axial center line of shaft 27 viewed in Fig. 1. In the midopen position of member 10, knife edge 28 will register with this horizontal plane which passes through the axial center line of the shaft 27. In the wide open position of member 10, the knife edge 28 will be approximately as far above the horizontal plane through the axial center line of shaft 27 as it was originally below it. This arrangement constitutes an accurate and almost frictionless means of transmitting motion from the valve stem for the oscillation of rock shaft 27. The initial adjustment of the parts is secured by the insertion of a washer-like shim 32 of proper thickness under the head 29 of the cap screw 30.

The bearing member 34 in which rock shaft 27 oscillates may be threaded into the casting comprising cylinder 16. Its flange 35 engages the outer face of the casting. It is preferably counterbored to provide a packed gland at 36 in which the packing may be compressed by a sleeve 37 carried by packing nut 38. The amount of friction developed by a rock shaft turning in packing is very much less than the friction developed in a rod reciprocating through packing which is equally liquid proof.

Also mounted externally upon the bearing member 34 is a dial fitting 40 having uniformly spaced graduations at 41. This fitting is held in any desired adjustment by a clamp nut 42. Coacting with the graduated face of the dial is a pointer 45 anchored to the end of rock shaft 27 and preferably projecting through a slot 46 in the dial.

The pointer preferably includes an arm 48 projecting at right angles thereto as shown in Fig. 1 and having one or more points of connection for a tension spring 49 relatively lighter than spring 20 and which is adjustable by means of adjusting screw 50. The tension of this spring is added to the compression of spring 20 opposing the movement of the flow responsive member 10 from its seat. The adjusting bolt 50 provides means whereby minor inaccuracies in the reading of the device may be corrected without requiring any change in the form or size of the slot or slots 25.

It will be noted that in the Fig. 1 position of the parts the tension spring 49 is not exerted at right angles to the lever arm 48, but is exerted in a direction having a very substantial radial component. This reduces the effective force of the spring as transmitted through the lever to the valve in proportion to the force exerted by the spring when its direction of tension is more nearly at right angles to the lever arm 48. I have found that this variation as between the relative effect on the valve of springs 49 and 20 compensates for variations which would otherwise occur in the reading of the device and contributes to the arrangement whereby I am able to calibrate the scale 41 in uniform divisions.

I claim:

1. In a flow meter, the combination with a valve casing providing a seat and having an opening registering therewith, of a closure for said opening having a skirt projecting toward said seat, a valve member flanged to engage said seat and having an apron axially movable through said seat and provided with a radial metering aperture, said valve member being engageable with the skirt of said closure to limit its movement respecting said seat, a cylinder provided in said closure and having a sleeve-like extension toward said seat, a valve stem connected with said valve and provided with a piston operating in said cylinder and cylinder extension, a compression spring seating around said sleeve-like extension and upon said valve member, a rock shaft journaled in said closure and having a rocker arm projecting into the path of movement of a portion of said stem, indicating means carried by said rock shaft externally of said closure, and a relatively lighter spring operatively connected with said rock shaft whereby to maintain said arm in contact with said stem portion and to supplement the action of said first mentioned spring, said lighter spring being adjustable as to its bias on said rock shaft.

2. In a flow meter, the combination with a casing having a valve seat opening and a second opening approximately aligned therewith, of a seat member fixed in said seat opening, a flow responsive member having a flange engageable with said seat member and a skirt radially slotted for the discharge of material across said seat member, a closure for the other opening of said casing, said closure providing a cylinder having a laterally enlarged head and a stop projecting into said casing into the path of movement of said flow-responsive member to limit the opening movement thereof, a piston operatively connected with said flow-responsive member and operating in the cylinder of said closure to provide dash pot resistance to sudden movement of said flow-responsive member, a compression spring outside of said piston seated against said closure and said flow-responsive member, a rock shaft journaled in the lateral enlargement of said cylinder head and provided with an arm projecting into the path of movement of said piston and provided with means for operative engagement thereby, whereby the movement of said flow-responsive member will oscillate said rock shaft, an indicator means carried by said rock shaft externally of said closure, said indicator means comprising a calibrated scale operatively mounted on said closure.

3. In a flow meter, the combination with a valve casing providing a seat and having an opening registering therewith, of a closure for said opening having a skirt projecting toward said seat, a valve member flanged to engage said seat and having an apron axially movable through said seat and provided with a radial metering aperture, said valve member being engageable with the skirt of said closure to limit its movement respecting said seat, a cylinder provided on said closure and having a sleeve-like extension toward said seat, a valve stem connected with said valve and provided with a piston operating in said cylinder and cylinder extension, a compression spring seating around said sleeve-like extension and upon said valve, a rock shaft journaled in said closure and having a rocker arm projecting into the path of movement of a portion of said stem, a calibrating screw interposed between said rocker arm and said portion of said stem, indicating means carried by said rock shaft externally of said closure, and a second spring operatively connected with said rock shaft whereby to maintain said arm in contact with said stem portion and to supplement the action of said first mentioned spring, said second spring being adjustable as to its bias on said rock shaft.

4. In a flow meter, the combination with a valve casing providing a seat and having an opening registering therewith, of a closure for said opening having a skirt projecting toward said seat, a valve member flanged to engage said seat and having an apron axially movable through said seat and provided with a radial metering aperture, said valve member being engageable with the skirt of said closure to limit its movement respecting said seat, a cylinder provided in said closure and having a sleeve-like extension toward said seat, a valve stem connected with said valve and provided with a piston operating in said cylinder and cylinder extension, a compression spring seating around said sleeve-like extension and upon said valve, a rock shaft journaled in said closure and having a rocker arm projecting into the path of movement of a portion of said stem, a calibrating screw interposed between said rocker arm and said portion of said stem and having a bearing surface on its head, said arm having a knife edge portion engageable upon the head of said screw and pivotally and slidably movable thereover, indicating means carried by said rock shaft externally of said closure, and a second spring operatively connected with said rock shaft whereby to maintain said arm in contact with said stem portion and to supplement the action of said first mentioned spring, said second spring being adjustable as to its bias on said rock shaft.

5. In a flow meter, the combination with a casing providing a port, of a valve for said port having a skirt portion receivable in said port and provided with a slot exposed in the opening of said valve, a spring acting directly upon said valve in opposition to its opening movement, a lever operatively connected to be oscillated by said valve in its opening movement, indicating means connected with said lever, and a second spring supplementing the action of the first spring in opposition to the opening of said valve and provided with means for adjusting its bias, said second spring being connected with said lever to move one end through an arc sufficiently extensive as to vary the effective thrust of said spring between a direction substantially at right angles to the lever and a direction having a substantial component radially from the axis of said lever whereby the change in effective length of the lever with respect to said second spring introduces a factor varying the effect of said second spring upon said valve as compared with the effect of the first mentioned spring thereon.

6. In a flow meter, the combination with a casing provided with a port, of a valve guided for movement to and from the ported portion of the casing and provided with a skirt having a slot exposed in the opening of the valve to accommodate flow through said port, a spring within the casing acting rectilinearly upon said valve in a direction to urge the valve toward its seat, a rock shaft journaled in the casing and provided with lever arms respectively inside and outside of said casing, the lever arm inside the casing being operatively connected to be actuated by the opening movement of the valve, indicating means connected with said rock shaft externally of said casing, biasing means acting on the said arm externally of the casing in a direction to oppose the opening of said valve, said biasing means being connected with a portion of said exterior arm to move through an arc in the oscillation of said rock shaft occasioned by the opening of said valve whereby to vary the effect of said biasing means in opposition to valve opening, and means for adjusting the bias of said biasing means.

ROY O. HENSZEY.